(12) United States Patent
Dessapt et al.

(10) Patent No.: US 11,590,903 B1
(45) Date of Patent: Feb. 28, 2023

(54) VEHICLE SEAT HAVING A DOCKING STATION FOR A MOBILE DEVICE

(71) Applicant: FAURECIA AUTOMOTIVE SEATING, LLC, Auburn Hills, MI (US)

(72) Inventors: Thomas Dessapt, Sunnyvale, CA (US); Cedric Ketels, White Lake, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 0 days.

(21) Appl. No.: 17/397,420

(22) Filed: Aug. 9, 2021

(51) Int. Cl.
*B60R 11/02* (2006.01)
*B60R 11/00* (2006.01)

(52) U.S. Cl.
CPC ... *B60R 11/0229* (2013.01); *B60R 2011/0015* (2013.01)

(58) Field of Classification Search
CPC ................ B60R 11/0229; B60R 11/02; B60N 2011/0015; B60N 2011/0012
USPC ...................................................... 297/217.4
See application file for complete search history.

(56) References Cited

U.S. PATENT DOCUMENTS

| 8,141,948 | B2 | 3/2012 | Cassellia |
| 9,758,248 | B2 | 9/2017 | Procter et al. |
| 10,429,891 | B2 | 10/2019 | Johnson |
| 2018/0215291 | A1 | 8/2018 | Sayed et al. |
| 2022/0094183 | A1* | 3/2022 | Huffman .......... B64D 11/00152 |

FOREIGN PATENT DOCUMENTS

| FR | 3006642 A1 | 12/2014 |
| WO | WO2007075461 | * 7/2007 |
| WO | WO2021087554 | * 5/2021 |

* cited by examiner

*Primary Examiner* — Mark R Wendell
(74) *Attorney, Agent, or Firm* — Reising Ethington P.C.

(57) ABSTRACT

A vehicle seat includes a seat bottom, a seat back, and a docking station for a mobile device. The docking station includes an adjustable height bracket and a reception surface. The reception surface is mounted to the seat back and has a first end and a second end opposite the first end. The reception surface is configured to tilt independently of the seat back, and the adjustable height bracket is configured to move slidably across the reception surface from the first end towards the second end. This structure for a docking station helps improve within vehicle integration.

14 Claims, 4 Drawing Sheets

VEHICLE SEAT HAVING A DOCKING STATION FOR A MOBILE DEVICE

TECHNICAL FIELD

The present disclosure is related generally to vehicle interiors and, more particularly, to vehicle seats having an integrated mobile device docking station.

BACKGROUND

Docking stations for mobile devices and integrated displays are common in vehicles. However, with integrated displays in particular, such as with the device shown in U.S. Pat. No. 8,141,948 to Cassellia et al., they do not allow for a user's own device with their own content to be the predominant display source. Instead, the arrangement is more complex. Further, with dockings stations such as those shown in U.S. Pat. No. 9,758,248 to Procter et al., they are often aftermarket add-on parts or parts within the vehicle that do not have the same look and feel as the overall interior cabin. In these implementations, the mobile device holder does not match the aesthetic of the rest of the cabin, or more particularly, the rest of the seat.

SUMMARY

An illustrative vehicle seat comprises a seat bottom, a seat back, and a docking station for a mobile device. The docking station comprises an adjustable height bracket and a reception surface mounted to the seat back. The reception surface has a first end and a second end opposite the first end. The reception surface is configured to tilt independently of the seat back, and the adjustable height bracket is configured to move slidably across the reception surface from the first end towards the second end.

In various embodiments, a first decorative covering covers the seat back and a second decorative covering covers the reception surface of the docking station.

In various embodiments, the first decorative covering matches the second decorative covering.

In various embodiments, the seat back includes a headrest, and the reception surface is configured to tilt independently of the headrest.

In various embodiments, the adjustable height bracket and/or a retaining groove includes an ambient light.

In various embodiments, a wireless charger for the mobile device is located behind the reception surface.

In various embodiments, a tilt axis for the reception surface is aligned with a plane defined by a shoulder portion of the seat frame.

In various embodiments, a tilt angle between a fully tilted position and a fully recessed position is between 6° and 20°, inclusive.

In various embodiments, the reception surface includes one or more edge flaps configured to cover one or more side edges of the mobile device, with the one or more edge flaps being at least partially recessed into a stowage area on the reception surface.

In various embodiments, a coat hanger extends from the reception surface.

In various embodiments, a speaker is located on the docking station, and the speaker is configured to play and/or amplify sound from the mobile device.

In various embodiments, the adjustable height bracket includes a mechanical lock configured to lock the adjustable height bracket into a position between the first end and the second end such that the adjustable height bracket spans entirely across the reception surface between two side edges.

In various embodiments, the adjustable height bracket is located at the first end of the reception surface in an access position, with a friction hinge being located at the second end.

In various embodiments, the adjustable height bracket is located at the first end of the reception surface in an access position, with a friction hinge also being located at the first end.

In various embodiments, the docking station is fully flush with respect to the seat back or completely recessed within an area on the seat back when in a fully recessed position.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described herein is a docking station having a more integrated and streamlined appearance with respect to the back of a vehicle seat. In an advantageous embodiment, a reception surface of the docking station is configured to tilt independently of the seat frame and/or the headrest, while an adjustable height bracket can move slidably across the reception surface from one end towards another opposite end. This arrangement can enhance accessibility and use experiences, particularly for passengers in one or more rear seats of the vehicle interior. Decorative coverings can be selectively implemented in certain locations to improve the vehicle aesthetics, elegance, and useability, compared to more typical aftermarket docking stations. Moreover, certain features, such as strategically located ambient lighting within an adjustable height bracket, can create a more intuitively useable docking station without detracting from the overall look and feel of the interior cabin.

Figure 1:
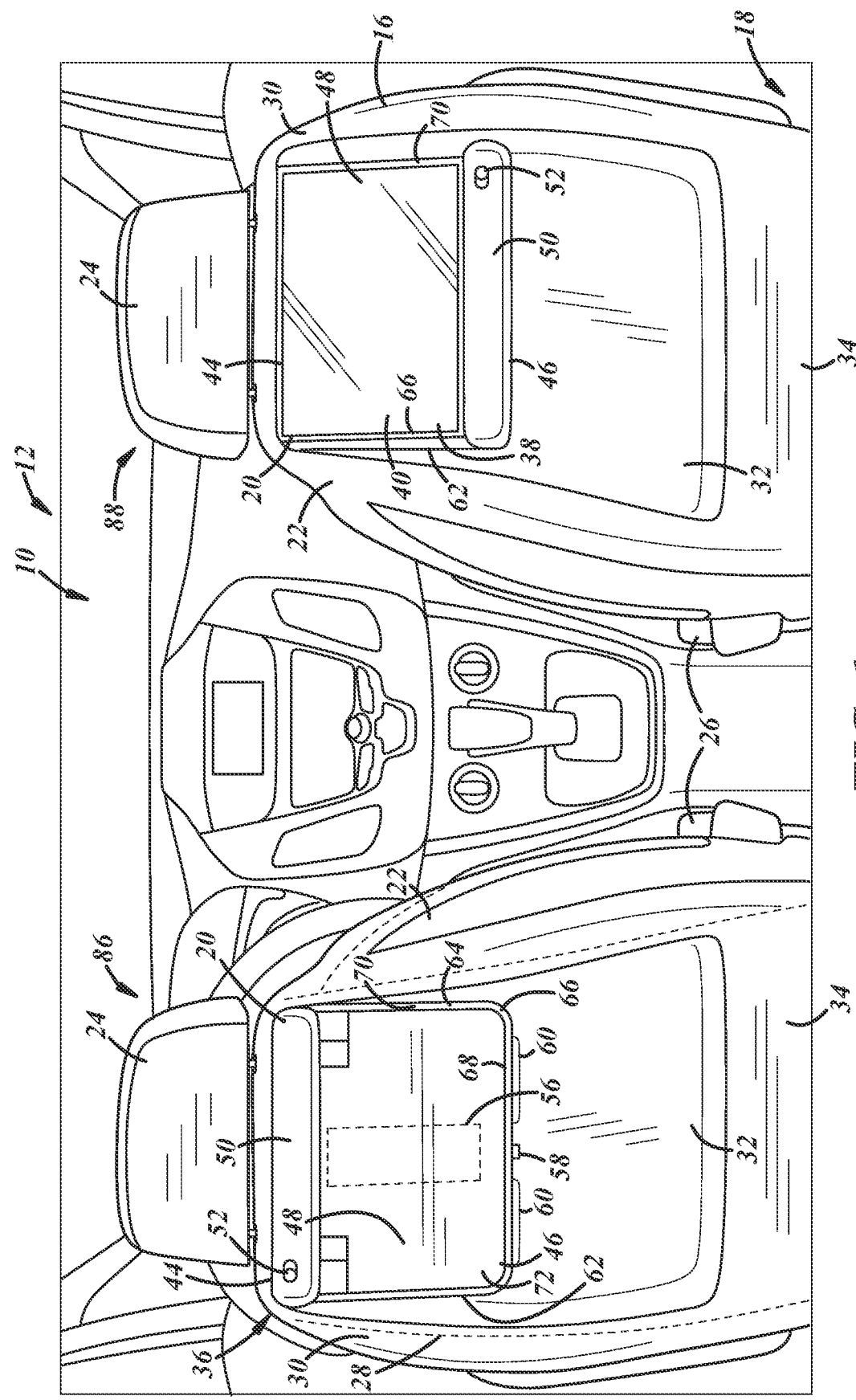
FIG. 1 shows an interior of a vehicle having docking stations integrated into the seats according to one embodiment.

FIG. 1 is a partial view of an interior cabin 10 for a vehicle 12 having a driver side seat 14 and a passenger side seat 16. The driver side seat 14 and/or the passenger side seat 16 may be a first row of seating in the vehicle 12, as shown, or it may be a rear row of seating, further back within the rear seating area 18. Each seat 14, 16 includes a docking station 20 mounted on the seat back 22. The seat back 22 includes a headrest 24, and a seat bottom 26 is located adjacent the seat back 22. The docking station 20 is integrated with the seat back 22 so as to enhance accessibility, improve use, and streamline the appearance of the interior cabin 10. The following description is focused on the seat 14, but the teachings are applicable to any other vehicle seat, such as the passenger seat 16 or another seat having a docking station 20.

The seat 14 includes a seat frame 28 that is covered by one or more foam layers, cushions, etc., along with a decorative covering 30. The decorative covering 30 may be a multi-layer structure, or a single layer structure overlaid on the cushioned underlayer(s). A fabric or leather layer may form the decorative covering 30; however, other materials are possible, such as a polymeric skin layer to cite one example. The seat 14 also includes a recessed area 32 in the seat back 22. The recessed area 32 provides space for the docking station 20. In some embodiments, such as that shown, the docking station 20 is fully flush with respect to a remaining rear portion 34 of the seat back 22. In other embodiments, the docking station 20 may be completely recessed within the area 32 when in a fully recessed position 36. In yet other embodiments, the docking station 20 may only be partially recessed within the area 32 when in a fully recessed position 36, or it may not be recessed at all, and the seat back 22 could be generally planar. Having the recessed area 32, however, allows for space saving within the interior cabin 10.

Figure 2:
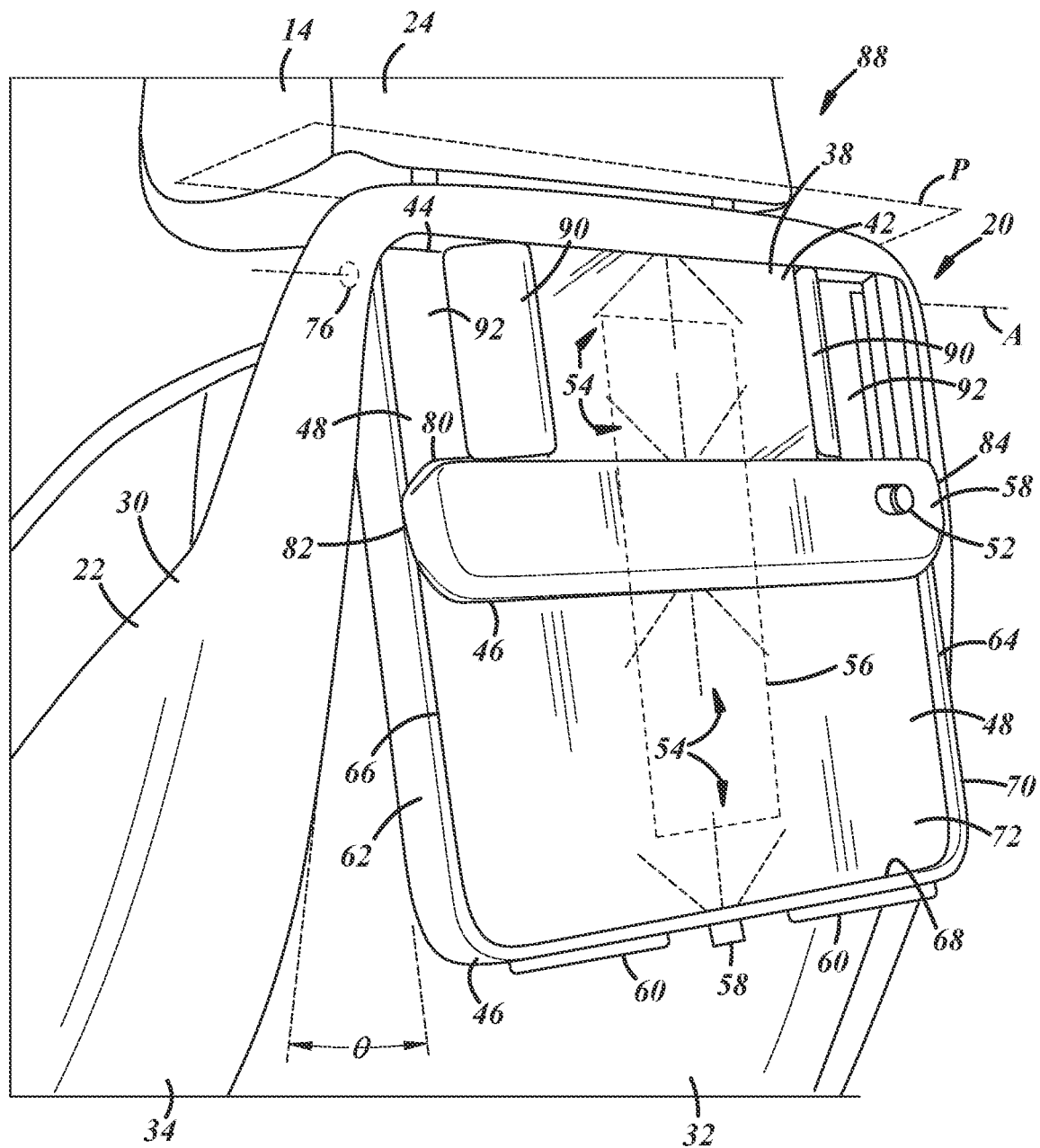
FIG. 2 shows one of the docking stations of FIG. 1 in a tilted position.

The docking station 20 is an integrated feature into the seat 14, and is configured to hold a variety of differently sized mobile devices 38. FIG. 1 shows the docking station 20 without a mobile device on the driver's side and a tablet 40 as the mobile device 38 on the passenger's side, and FIG. 2 shows a phone 42 as the mobile device. Other mobile device types are certainly possible, and the docking station 20 is configured so as to be adaptable depending on the overall size and shape of the mobile device 38. Moreover, given the intuitive structure of the docking station 20 and its integration in the rear portion 34 of the seat back 22, it can improve ride sharing vehicles in particular, as a user can easily access and employ the docking station.

The docking station 20 includes a first end 44, a second end 46 that is opposite the first end, and a reception surface 48 between the first end and the second end. The first end 44 is a top end and the second end 46 is a bottom end, with top/first and bottom/second being used herein to locate things as being closer to the roof of vehicle 12 or closer to the floor of the vehicle, respectively. The docking station 20 further includes an adjustable height bracket 50 which is configured to slide along the reception surface 48 from the first end 44 to the second end 46. This arrangement is distinguishable, for example, from brackets that extend outwardly from a reception surface, and can provide a more compact and integrated structure. The docking station 20 further includes a number of optional components such a mechanical lock 52 for the bracket 50, ambient light 54 integrated within the bracket or at another location to illuminate the reception surface 48, a wireless charger 56, a coat hanger 58, and one or more speakers 60. These optional sub-components are detailed further below.

The first end 44 and the second end 46 are located on either side of the reception surface 48 and are spaced from each other by the reception surface 48 and opposing side edges 62, 64. A projecting lip 66 can be included, which may also be structured to form an internal retaining groove 68. The projecting lip 66 and retaining groove 68 can create extra resting area for the mobile device 38, and also help improve retention. The projecting lip 66 projects outwardly from the reception surface 48, and may be included along one end or edge exclusively, or may extend partially or all the way around the perimeter of the reception surface 48. The groove 68 can act as a bezel to frame the lower portion of the docking station 20.

The ends 44, 46, edges, 62, 64, and reception surface 48 include a rigid substrate material 70 that is the physical support layer of the docking station 20. Then, in an advantageous embodiment, at least the reception surface portion of the substrate 70 is covered with a second decorative covering 72. In some embodiments, the outer surface of the projecting lip 66 may also include a decorative covering over the substrate 70 (e.g. a chromed edge and/or groove). The substrate 70 is typically the most rigid of the illustrated layers of the multi-layer assembly and thereby provides structural support for the overlying decorative covering layer(s). Fiberglass-reinforced polypropylene having a thickness of 1.6 mm to 4 mm is one example of a suitable substrate 70 but various other types of materials and material combinations and/or different thickness ranges can be employed in a similar manner (e.g., ABS and/or PC).

The reception surface 48 is advantageously a more planar, rigid structure, and includes a second decorative covering 72. The planar structure may facilitate improved wireless charging, for example. In some embodiments, a rubberized or gripping material may be used for all or some of the reception surface 48. For example, rubber edges in sections of about 1 mm long could create sidewalls to help reduce lateral movement of the mobile device 38.

The entirety of the reception surface 48 is advantageously covered with the decorative covering 72. This can improve within vehicle integration, and can help control functionality in some instances (e.g., better facilitation of wireless charging by changing the permittivity of the surface). In one particular embodiment, the decorative covering 72 on the reception surface 48 matches (i.e., shares an attribute with) the decorative covering 30 used on the remainder of the seat 14. For example, having the decorative coverings 30, 72 be the same material may be easier to manufacture. Having the decorative coverings 30, 72 be the same color, for example, can improve the aesthetic of the interior cabin 10. It is possible, however, for the decorative coverings 30, 72 not to match, and will depend on the desired look and functionality required for the cabin 10.

The decorative coverings 30, 72 may have a thickness in a range from 0.5 mm to 2.5 mm, or preferably from 0.5 mm to 1.5 mm. In one example, the thickness of each decorative covering 34, 38 is between 0.6 mm and 1.0 mm, or about 0.8 mm. Other thickness ranges and configurations are certainly possible. For example, each decorative covering 30, 72 may be thicker in certain regions than others, or it may have a curved or non-planar shape. In an advantageous embodiment, the first decorative covering 30 is a softer material, such as a cushioned fabric or natural skin layer, whereas the second decorative covering 72 is a more rigid material, such as wood veneer or a polymeric gripping skin directly interfacing the substrate 70. This particular arrangement of decorative coverings 30, 72 can provide for increased cushioning in the primary areas of the seat 14, while providing a more flat and rigid surface for receiving the mobile device 38. Adhesive or bonding layers can be included between two or more of the various layers or components of the docking station 20, such as between the substrate 70 and the decorative layer 72. Further, other layers may be included in addition to those particularly described, such as one or more protective outer layers on the reception surface 48, fabric interlayers, conductive electronic layers, or other functional and/or aesthetic layers.

The reception surface 48 is configured to tilt between the fully recessed position 36 (see e.g., FIG. 1) and a fully tilted position 74, as shown in FIG. 2. The reception surface 48 is configured to tilt independently of the seat back 22 and the headrest 24, which enhances user accessibility. To achieve the tilted position 74, a pivoting friction hinge 76 can be used to directly or indirectly couple the first end 44 with the seat frame 28. Locating the hinge 76 near the top or first end 44 can advantageously increase the tilt angle θ as compared to hinge locations located closer to the second end 46 than what is illustrated. As used herein, near the first or top end 44 means that the hinge point is located closer to the top edge than to the second end 46. The pivoting friction hinge 76 provides for rotation of the docking station 20 about the tilt axis A. The tilt axis A is advantageously aligned with a plane P defined by a shoulder portion 78 of the seat back 22. The plane P is defined by the upper shoulder portion 78 of the seat 14. In this embodiment, the axis A is parallel to the main orientation of the plane P, which allows for the docking station 20 to move more advantageously with respect to the seat back 22. Other hinge types for effectuating tilting are certainly possible, but use of a friction hinge 76 can be beneficial as it can hold the docking station 20 at a desired tilt angle θ. Advantageously, the tilt angle θ between the fully tilted position 74 and the fully recessed position 36 is between about 6° and 20°, inclusive. This particular angular range for the tilt angle θ, and more preferably, from 10° to 20°, inclusive, is typically more comfortable to a user in the rear seating area 18, and can be adjusted by the user to account for glare, height of the user, etc. The desired range for the tilt angle θ however, may depend on the position of the docking station 20 at the fully recessed position 36. For example, a seat back 22 that is more reclined may require a larger range for the tilt angle θ. A space can be provided behind the first end 44 to provide room for tilting, or there may be some downward motion at the hinge point 76 that occurs when the second end 46 rotates outward.

The adjustable height bracket 50 can be included to promote stable retention of a variety of differently sized mobile devices 38 at the docking station 20. With particular reference to FIG. 2, the adjustable height bracket 50 includes a hanging groove 80 that spans between sliding edges 82, 84, which may slide within the side edges 62, 64 respectively, or in some embodiments, slide over the side edges. An underside of the hanging groove 80 can include a rubberized material to further enhance retention, and a decorative covering can be used on the surface exposed to the interior cabin 10. In some embodiments, the hanging groove 80 may be adjustable to accommodate mobile devices 38 of varying thicknesses. The adjustable height bracket 50 is configured in this embodiment to rest at the first end 44 when in an access position 86 (see e.g., seat 14 in FIG. 1 which does not have the mobile device), and then slide down towards the second end 46 when in an occupied position 88 (see e.g., seat 16 in FIG. 1 and FIG. 2). This arrangement maximizes space within the cabin 10 and allows for the docking station 20 to be more fully recessed with respect to the seat back 22. Advantageously, the bracket 50 is configured to move entirely across the reception surface 48 from the first end 44 to the second end 46. This can help with accommodating different sized mobile devices 38. In some embodiments, the bracket 50 may allow for the storage of more than one mobile device 38 on the docking station 20 at one time.

The adjustable height bracket 50 in the illustrated embodiment includes a mechanical lock 52 that retains the hanging groove 80 in the access position 86. Depressing or switching the mechanical lock 52 can release a detent or the like that retains spring-loaded or otherwise biased sliders. In some embodiments, adjustment may be facilitated in an alternate fashion, such as turning a knob to change the position of sliding edges 82, 84 with respect to the docking station 20. In yet other embodiments, there may be no mechanical advantage used to help ease the change between the access position 86 and the occupied position 88.

Ambient lighting 54, as shown schematically in FIG. 2, can be included to help a user intuitively guide the mobile device 38 to the docking station 20 and/or the wireless charger 56. The lighting 54 can be powered by a vehicle-based power source, along with the wireless charger 56. The lighting 54 may include any operable light source (e.g., fiber optic, fluorescent or incandescent bulb, light emitting diode (e.g., LED or OLED), etc.), the position of which may be at least partially dictated by the structure of the reception surface 48. FIG. 2 shows integration of lighting 54 into the adjustable height bracket 50, as well as lighting located in the first and second ends 44, 46. Lighting 54 in the adjustable height bracket 50 may help guide a user more intuitively to the docking station 20. In other implementations, there may be less or more lighting that what is schematically illustrated in FIG. 2. Further, the lighting 54 may only be a single light color, or it may provide multiple colors.

In some embodiments, a wireless charger 56 can be included behind the reception surface 48 to wirelessly charge the mobile device 38. The range of the wireless charger 56 generally defines the size and shape of the wireless charging area on the decorative outer side of the decorative layer 72 (along with other factors, including but not limited to, the ability of the materials of the substrate 70 and decorative covering 72 to allow for the transmission of wireless power). The wireless charger 56 can be an integral component of the docking station 20, or it may be separately provided beneath the reception surface 48 when installed in the vehicle 12. The wireless charger 56 typically consists of one or more coils and electronics. It may be advantageous to embed the coils into the reception surface 48 (e.g., into the substrate 70 or in-between layers) so that they are closer to the decorative outer side of the decorative layer 72, which can increase the size of the wireless charging area on the reception surface 48. The wireless charger 56 can be powered by a vehicle-based power source and may further include haptic feedback capability, such as a piezoelectric oscillator that causes vibrations to be induced in the docking station 20 when triggered by touch, proximity, or other input.

Other optional features include a coat hanger 58 and one or more speakers 60, which in the illustrated embodiment, are located along the second end 46. Other operable locations are certainly possible, but at least for the coat hanger 58, integration near the second end 46 can enhance ease of use when the tilt axis A is located toward the first end 44. The speakers 60 may include one or more sound bars that are configured to play and/or amplify sound from the mobile device 38. Accordingly, a power source and/or adapter may be included on or near the docking station 20, which can help facilitate connection between the vehicle 12 and the mobile device 38.

The embodiment illustrated in FIGS. 1 and 2 also includes edge flaps 90 which are recessed into a stowage area 92 on the reception surface 48. The edge flaps 90 may be used to cover one or more side edges of a mobile device 38. The edge flaps 90 are configured to fold into and out of the stowage area 92, and may be particularly useful for smaller mobile devices such as the phone 42. The edge flaps 90 may help to shroud the edges of the phone 42 when the docking station is in the occupied position 88. This arrangement has the potential to at least partially reduce glare.

Figure 3:
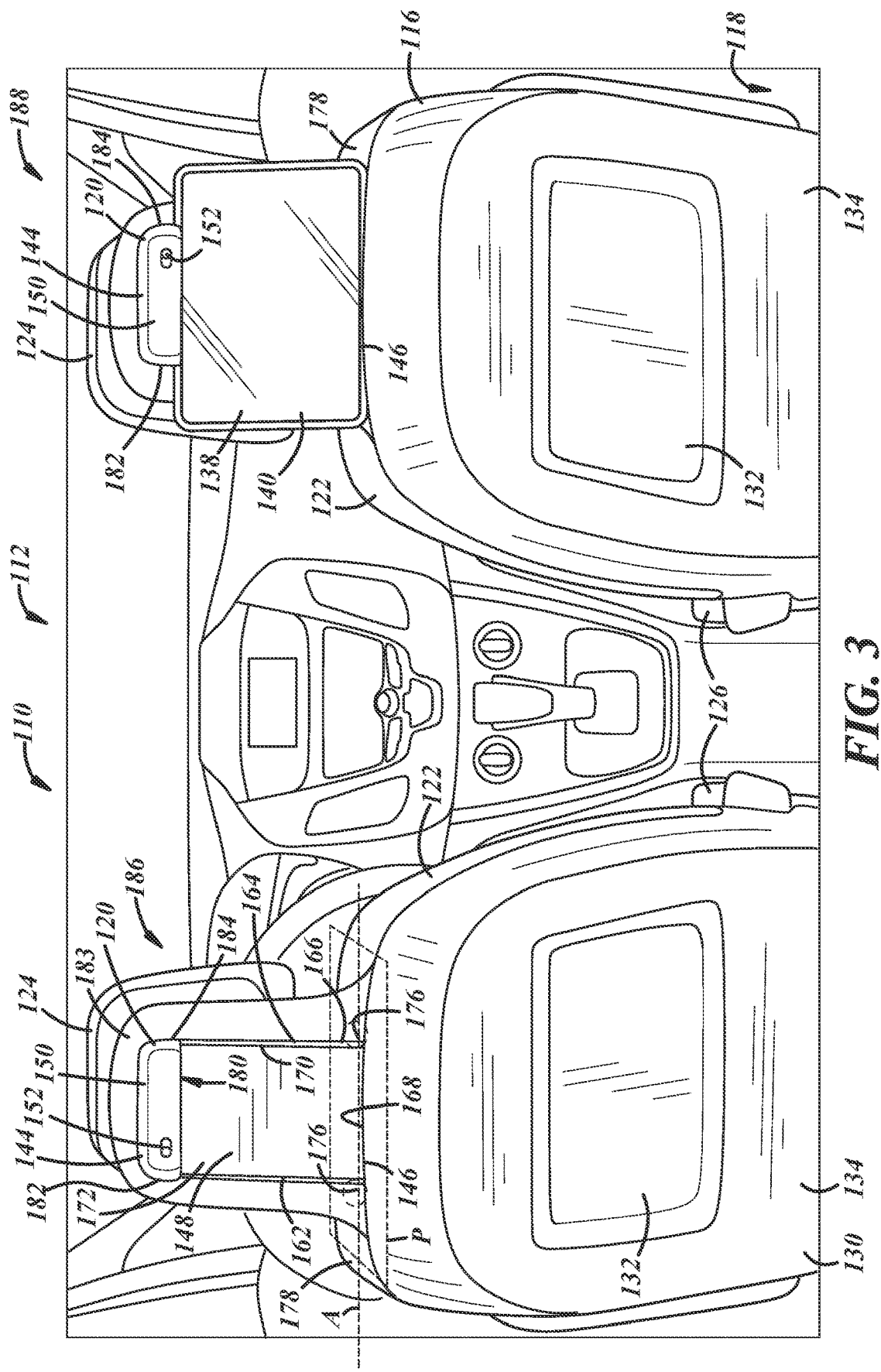
FIG. 3 shows an interior of a vehicle having docking stations integrated into the seats according to another embodiment.
Figure 4:
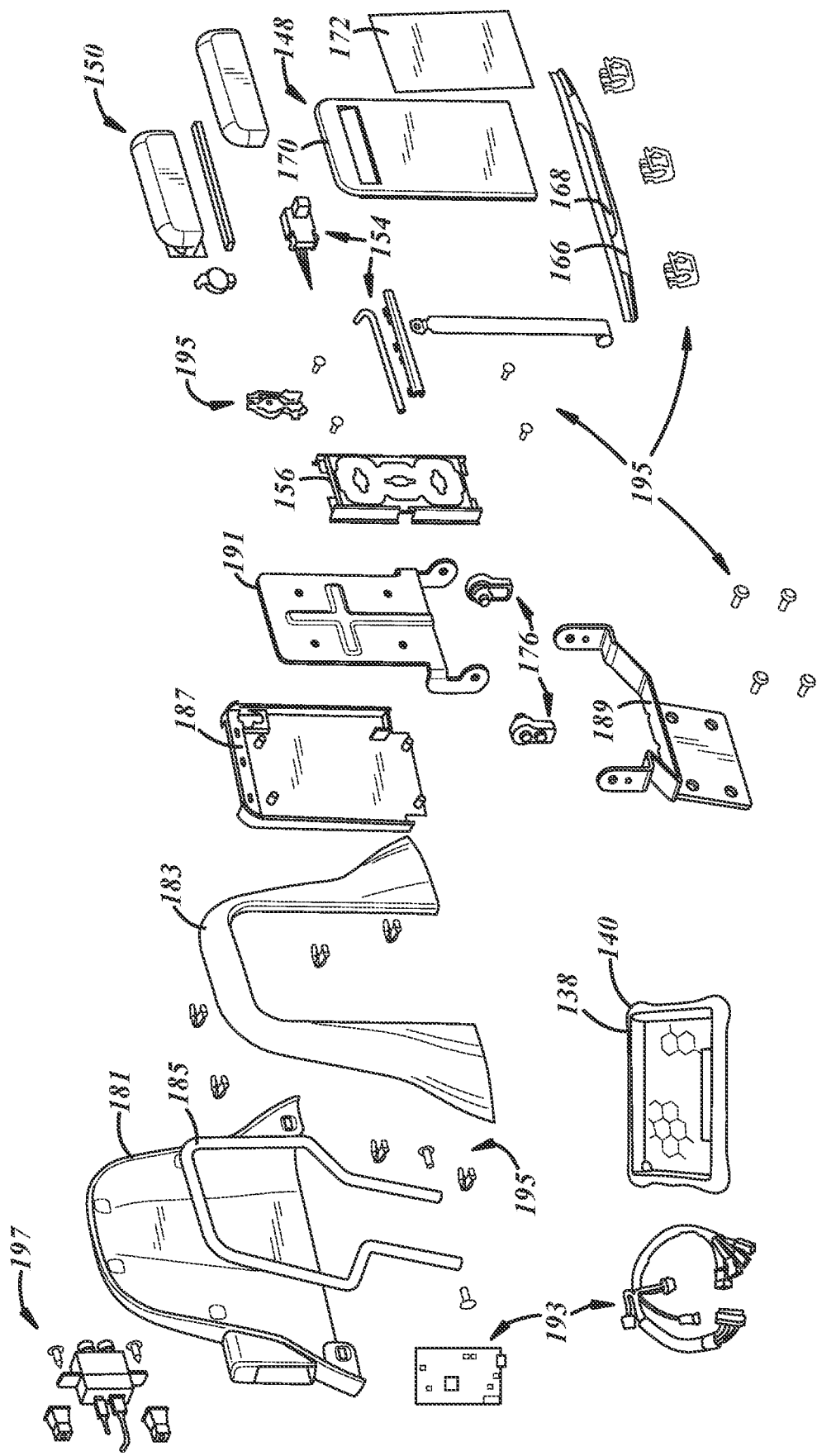
FIG. 4 is an exploded view of one of the docking stations of FIG. 3.

FIGS. 3 and 4 illustrate another embodiment of a docking station 120. In this embodiment, like reference numerals are meant to disclose like components to the embodiments illustrated in FIGS. 1 and 2. Accordingly, the teachings relating to the components of FIGS. 1 and 2 are also generally applicable to the teachings relating to the components of the docking station 120, and vice versa. However, in this embodiment, the friction hinges 176 are located at the second end 146. This provides for a tilt axis A that is completely aligned with the plane P defined by the shoulder portion 178, although this may vary depending on the attachment position with respect to the seat frame. Additionally, in this embodiment, the first end 144 tilts toward the rear seating area 118, whereas with the first embodiment, the second end tilted outward toward the rear seating area. Given that the docking station 120 is oriented higher and closer to the headrest 124, this tilting arrangement may help better promote visibility of the mobile device 138. In this embodiment, a coat hanger can be integrated at the top or first end 144, given that the first end is the tilting end of the reception surface 148.

FIG. 4 shows example parts for the docking station 120, which may also be applicable to the docking station 20 as well, with appropriate changes being made to adjust the positioning of the tilt axis A and hinges. The docking station 120 includes a back housing 181, a front housing 183, and a mounting bracket 185 located therebetween. A tilt plate 187 can connect to a tilt bracket 189, along with an EMI shield 191, which can help prevent interference from the wireless charger 156. The reception surface 148, which includes the substrate 170 and decorative covering 172, are then mounted to close off the interior components of the docking station 120. Various electrical components 193, such as wires, PCBs, etc., can be included, along with various connectors 195, such as screws, clips, etc. can also be included. This view also illustrates the integration of a USB charging port 197, which can be included for charging mobile device 138. Other power sources may be included on or near the docking station 120, such as a plug to fit a conventional 12V-DC automotive socket, or a 110V-AC plug, for example. External wiring and/or internal wiring can electrically interconnect the vehicle 12 or other external power source with the charging ports 197. In some embodiments, an internal power source such as a rechargeable battery pack is built-in to seat 14. This illustrated overall structure, including the internal components, can vary depending on the desired implementation.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A vehicle seat, comprising:
   a seat bottom;
   a seat back; and
   a docking station for a mobile device, the docking station comprising:
      an adjustable height bracket; and
      a reception surface mounted to the seat back, the reception surface having a first end and a second end opposite the first end, wherein the reception surface is configured to tilt independently of the seat back, wherein the adjustable height bracket is configured to move slidably across the reception surface from the first end towards the second end, and wherein the adjustable height bracket is located at the first end of the reception surface in an access position, with a friction hinge being located at the second end.

2. The vehicle seat of claim 1, wherein a first decorative covering covers the seat back and a second decorative covering covers the reception surface of the docking station.

3. The vehicle seat of claim 2, wherein the first decorative covering matches the second decorative covering.

4. The vehicle seat of claim 1, wherein the seat back includes a headrest, and the reception surface is configured to tilt independently of the headrest.

5. The vehicle seat of claim 1, wherein the adjustable height bracket and/or a retaining groove includes an ambient light.

6. The vehicle seat of claim 1, wherein a wireless charger for the mobile device is located behind the reception surface.

7. The vehicle seat of claim 1, wherein a tilt axis for the reception surface is aligned with a plane defined by a shoulder portion of the seat frame.

8. The vehicle seat of claim 7, wherein a tilt angle between a fully tilted position and a fully recessed position is between 6° and 20°, inclusive.

9. The vehicle seat of claim 1, wherein the reception surface includes one or more edge flaps configured to cover one or more side edges of the mobile device, wherein the one or more edge flaps are at least partially recessed into a stowage area on the reception surface.

10. The vehicle seat of claim 1, wherein a coat hanger extends from the reception surface.

11. The vehicle seat of claim 1, wherein a speaker is located on the docking station, and the speaker is configured to play and/or amplify sound from the mobile device.

12. The vehicle seat of claim 1, wherein the adjustable height bracket includes a mechanical lock configured to lock the adjustable height bracket into a position between the first end and the second end such that the adjustable height bracket spans entirely across the reception surface between two side edges.

13. The vehicle seat of claim 1, wherein a friction hinge is also located at the first end.

14. The vehicle seat of claim 1, wherein the docking station is fully flush with respect to the seat back or completely recessed within an area on the seat back when in a fully recessed position.

\* \* \* \* \*